Feb. 5, 1924.

W. K. NIGH ET AL 1,482,858

HANDLEBAR GRIP FOR MOTOR CYCLES

Filed April 25, 1922

Inventors.
W. K. Nigh.
B. H. Schaff.

By

Lacey & Lacey, Attorneys

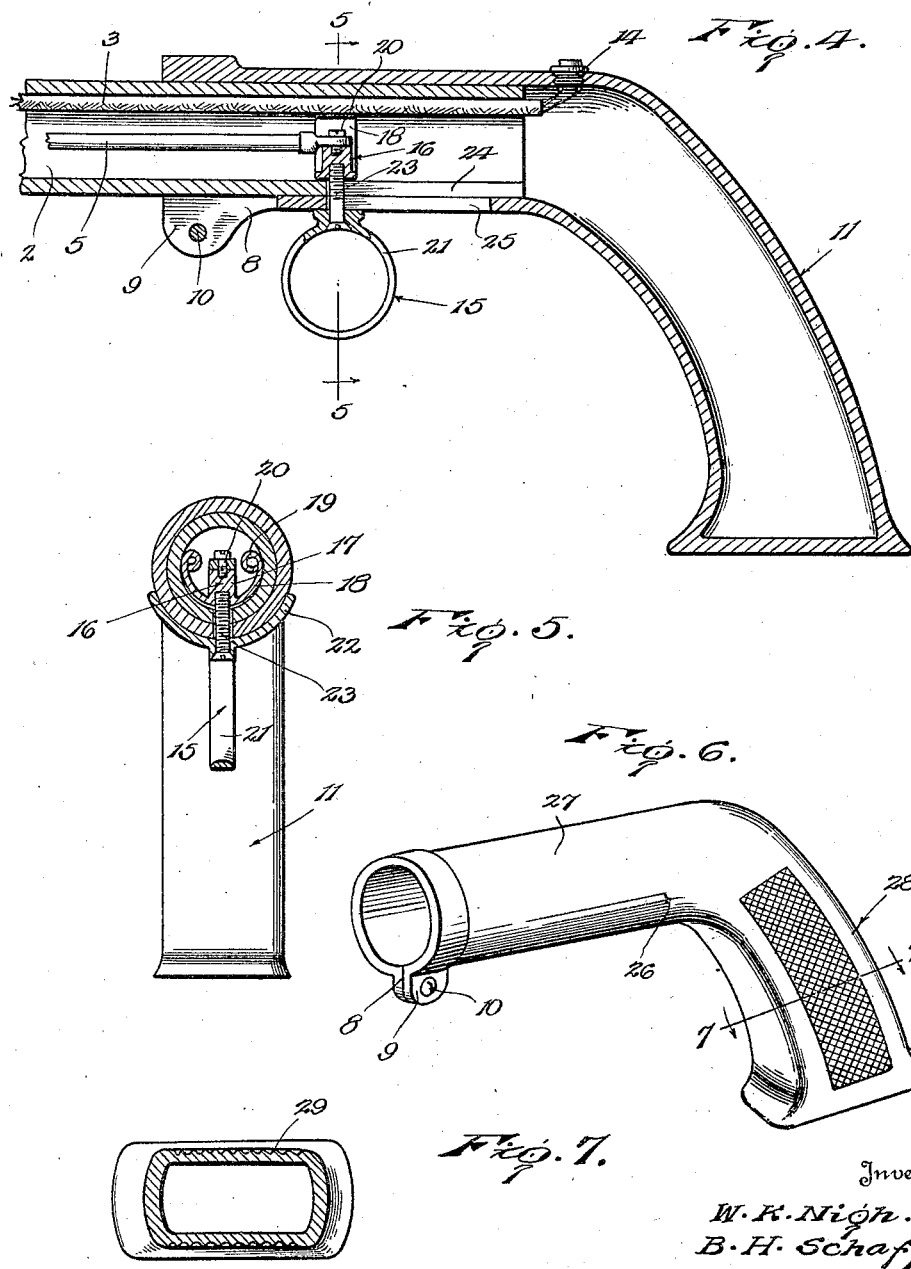

Patented Feb. 5, 1924.

1,482,858

UNITED STATES PATENT OFFICE.

WILLIAM K. NIGH AND BENJAMIN H. SCHAFF, OF HAGERSTOWN, MARYLAND.

HANDLE-BAR GRIP FOR MOTOR CYCLES.

Application filed April 25, 1922. Serial No. 556,410.

*To all whom it may concern:*

Be it known that we, WILLIAM K. NIGH and BENJAMIN H. SCHAFF, citizens of the United States, residing at Hagerstown, in the county of Washington and State of Maryland, have invented certain new and useful Improvements in Handle-Bar Grips for Motor Cycles, of which the following is a specification.
This invention relates to improvements in handle bar grips for motorcycles or bicycles. In the ordinary construction of motorcycles and bicycles the handle bar grips are fitted upon the ends of the arms of the handle bars and extend in axial alinement therewith and one or both of the grips is rotatably mounted so as to adapt it, by rotative adjustment, to serve as means for controlling the operation of the engine and other associated mechanisms. This disposition of the grips however requires that the hands and forearms of the rider shall be placed in an uncomfortable position, imposing a strain upon the wrists not only while maintaining a proper grip upon the handle bars but also in rotating the grips to operate the several controls. Therefore it is the primary object of the present invention to provide a handle bar grip so constructed and arranged with relation to the arms or forks of the handle bars as to adapt the handle bars to be grasped and securely held without straining or tiring the muscles of the hands and arms and thus provide for more convenient steering of the machine and greater safety in its management.

It is a further object of the invention to provide in connection with a grip possessing the advantages above pointed out, a novel arrangement of controls adapting them to be more conveniently operated and without imposing any additional strains upon the wrist muscles or requiring a relaxation of the firm grip upon the handle bars.
In the accompanying drawings:

Figure 4 is a vertical longitudinal sectional view through the grip and the end of the handle bar to which it is fitted and illustrating the arrangement of the controls.

Figure 5 is a vertical transverse sectional view taken substantially on the line 5—5 of Figure 4 looking in the direction indicated by the arrows;

Figure 6 is a perspective view of a modified form of grip which may be employed upon bicycles or upon motorcycles where the controls are not to be located upon the handle bars; and

Figure 7 is a horizontal sectional view on the line 7—7 of Figure 6.

Figure 1:
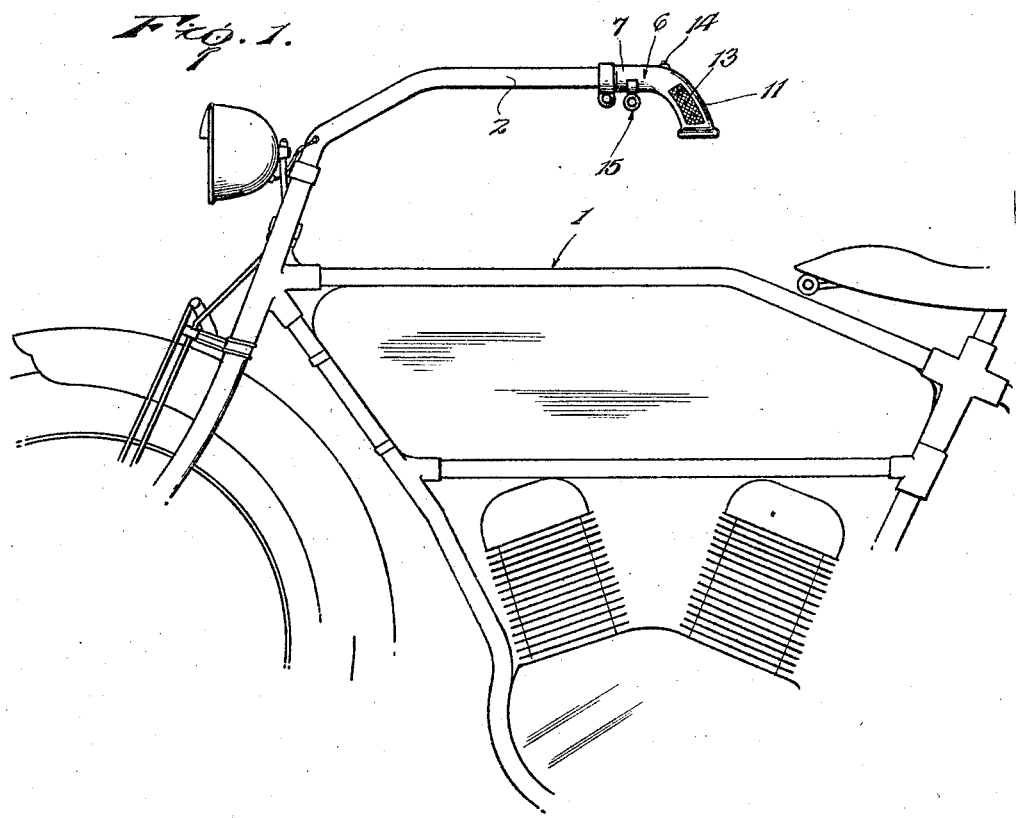
Figure 1 is a side elevation of the grip embodying the invention applied to the handle bar of a motorcycle.

In the drawings Figure 1 illustrates so much of a motorcycle as is necessary to display the application of the invention, and the same is indicated in general by the numeral 1 and is provided with the usual handle bars 2 which are of the ordinary tubular form and through one of which there is led, as usual, a cable or conductor wire 3 leading to the magneto cut-out or horn, and a rod or wire 5 which extends to and is operatively connected with the throttle of the carburetor and which by longitudinal adjustment controls the throttle so as to regulate the supply of fuel to the motor and thus regulate the speed. In some types of machines various other controls will be employed embodying conductor wires or motion transmitting elements extending or operating through one or the other or both of the handle bars, but while the drawings illustrate a specific example of such elements it will be evident from the description which is to follow that the invention is not directly concerned with the character of the controls but rather with their arrangement with respect to certain portions of the handle bar grips embodying the invention, the purpose being, as before stated, to provide a combination and arrangement of elements such as will adapt the controls to be more conveniently manipulated and without relaxing the grip upon the handle bars. Also the invention resides in the particular form given the grips as will presently be explained and by reason of which form and the disposition of the grips with relation to the ends of the handle bars, the bars may be more conveniently grasped and more securely held and without tiring the arm muscles.

In the drawings and more particularly in the form illustrated in Figures 1 to 5 inclusive, the grip embodying the invention is indicated in general by the numeral 6 and resembles somewhat the grip of a revolver. The grip comprises a tubular attaching portion or shank which is indicated by the numeral 7 and which is adapted to be fitted onto the end of the associated handle bar and is split along its under side at and adjacent its forward end as indicated by the numeral 8 and provided at the opposite sides of its split with ears 9 through which a clamp bolt 10 is passed and which bolt is adapted to be tightened so as to frictionally bind the split portion of the shank about the end of the handle bar and thus secure the grip in place thereon. The grip further comprises a handle or hand grip member indicated by the numeral 11, and this member 11 extends downwardly and rearwardly from the attaching shank portion 7 at a suitable angle and is of an exterior contour to best adapt it to be conveniently and comfortably grasped by the hand, it being preferably formed in its opposite sides with recesses 12 to receive grip plates 13 which may be secured in place in any suitable manner and are preferably roughened so as to enable the rider to obtain a more firm grasp upon the member 11. At this point it will be evident that due to the downward angular disposition of the handle or hand grip member 11 with relation to the attaching shank 7 of the grip, the said member 11 may be more conveniently and comfortably grasped and held under all driving conditions and without imposing any undue strain upon the muscles and particularly the wrist muscles.

In connection with the conductor wire 3 there is provided a switch 14 which may be of the push button type or any other desired type and which is mounted upon or set into the upper side of the shank member 7 substantially at the juncture of said shank member with the hand grip member or handle 11, and this switch constitutes one of the controls associated with the grip and is adapted to be actuated by the thumb of the hand grasping the member 11.

Figure 2:
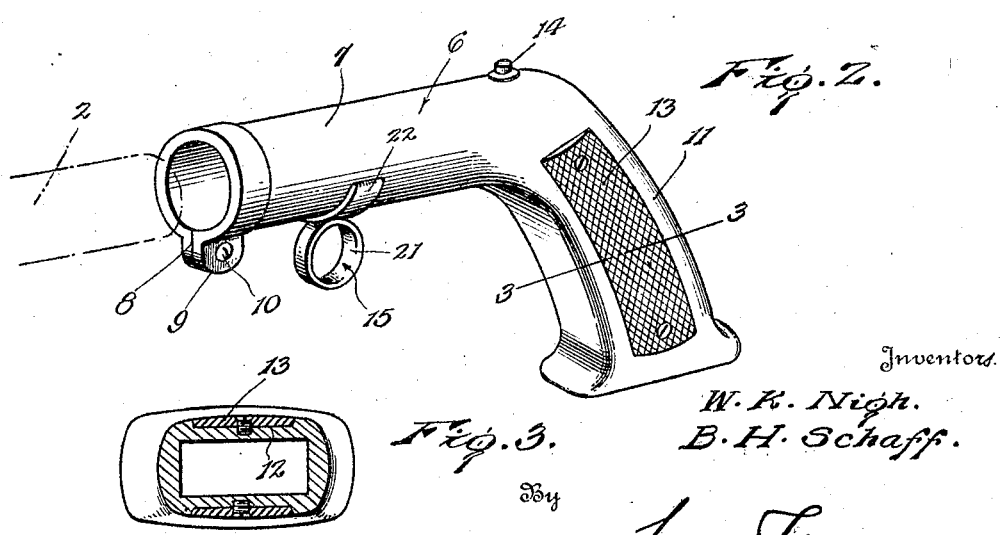
Figure 2 is a perspective view of one of the grips removed.
Figure 3:
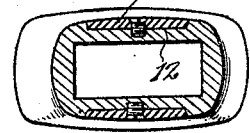
Figure 3 is a sectional view taken substantially on the line 3—3 of Figure 2.

The other control, indicated in general by the numeral 15, is associated with the member 5 and comprises a friction slide 16 which is arranged within the tubular end of the handle bar with which the grip 6 is associated, and preferably comprises a central body portion 17 and laterally disposed bearing portions 18 which preferably are resilient and are curved upwardly and laterally in opposite directions from the body portion 17 and preferably have their upper ends overturned upon themselves as at 19. These portions 18 are designed to bear with a greater or less degree of firmness frictionally against the inner surface of the tubular handle bar, and the rear end of the rod or wire 5 is secured in any suitable manner as for example by a screw 20 to the upper end of the body portion 17. The control further embodies a finger ring 21 disposed in a vertical plane beneath the shank member 7 of the grip and provided with laterally extending bearing portions 22 which are curved to conform to the exterior contour of the said grip member 7 as best shown in Figures 2 and 5 of the drawings. A securing screw 23 is threaded through the finger ring 21 where the members 22 are connected with said ring and is secured in the lower end of the body portion 17 of the friction slide 16. The securing screw 23 extends through slots 24 and 25 formed respectively in the lower sides of the handle bar 2 and shank member 7 of the grip, and serves to guide the movement of the control in longitudinally adjusting the rod or wire 5. By reference to Figure 5 of the drawings it will be observed that the lower sides of the bearing portions 18 and the lower end of the body portion 17 of the friction slide 16 may be spaced somewhat from the inner surface of the handle bar, and inasmuch as the portions 18 are resilient, the screw 23 may be adjusted to draw the friction slide 16 downwardly and thus cause its bearing portions 18 to frictionally engage or bear against the inner surface of the handle bar with a greater or less degree of firmness as may be desired.

From the foregoing it will be evident that the finger ring of the control 15 is so positioned that it is readily engageable by the forefinger of the hand grasping the member 11 of the grip and that it may be conveniently shifted backwardly and forwardly to adjust the control rod 5. Also it will be evident that the switch comprising the control 14 may be conveniently manipulated by the thumb. Furthermore both controls may be manipulated without relaxing the grip upon the handle bars thus insuring greater safety and rendering the control of the machine more convenient and less irksome to the rider.

In that form of the invention shown in Figure 6 of the drawing the grip is indicated in general by the numeral 26 and comprises an attaching shank portion 27 and a handle or grip portion 28 corresponding to the parts 7 and 11 previously described. This grip however is devoid of any controls and may be employed upon the handle bars of bicycles or upon one or another of the handle bars of motorcycles where the controls are not located as in the previously described form. Also, as a modification, the opposite side faces of the handle portion 28 may be in this form roughened by the direct formation of corrugations or serrations therein as indicated by the numeral 29.

Having thus described the invention, what is claimed as new is:

1. The combination of a motorcycle or bicycle handle bar grip having a downwardly deflected hand grip member and controls supported by the grip in position for actuation one by the thumb and another by another finger of the hand grasping the said hand grip member.

2. The combination of a motorcycle or bicycle handle bar grip having a downwardly deflected hand grip member, and a control slidably supported at the under side of the grip in advance of the said member and in position for actuation by a finger of the hand grasping said member.

3. The combination of a motorcycle or bicycle handle bar grip having a downwardly deflected hand grip member, a control upon the upper side of the grip in proximity to said member for actuation by the thumb, and a control upon the under side of the grip in advance of said member for actuation by another finger of the hand grasping the said hand grip member.

4. The combination with a motorcycle or bicycle handle bar of tubular form provided with a longitudinal slot, of a grip comprising a tubular shank fitted onto the end of the said handle bar and having a slot substantially in registration with the slot in said handle bar, a hand grip member extending downwardly from and forming a juncture with the rear portion of the shank, means for securing the shank upon the bar, a finger-operable member slidable along the under side of the shank, a member within the bore of the bar for the connection thereto of a control element, and means extending through the slots and connecting the last-mentioned member and the said finger-operable member.

5. The combination with a handle bar of tubular form having a longitudinal slot, of a grip having a tubular shank fitted onto the end of said bar and held in place thereon and provided with a slot for substantial registration with the slot in said bar, a finger-operable member slidable along the under side of the shank, a hand grip member extending downwardly from the shank in rear of the said finger-operable member, a friction member movable longitudinally in the bore of the handle bar and coacting frictionally with the wall of said bore and arranged for the connection thereto of a control element, and means extending through said slots and connecting the said finger-operable member and the friction member.

6. The combination with a handle bar of tubular form having a longitudinal slot, of a grip having a tubular shank fitted onto the end of said bar and held in place thereon and provided with a slot for substantial registration with the slot in said bar, a finger-operable member slidable along the under side of the shank, a hand grip member extending downwardly from the shank in rear of the said finger-operable member, a friction member movable longitudinally in the bore of the handle bar and coacting frictionally with the wall of said bore and arranged for the connection thereto of a central element, and means extending through said slots and connecting the said finger-operable member and the friction member, the said friction member being resilient and comprising an intermediate portion and lateral bearing portions, and the said connection between said member and the finger-operable member being adjustable to draw said members toward each other whereby to regulate the frictional engagement of said bearing portions with the wall of the bore of the handle bar.

7. The combination with a motorcycle or bicycle handle bar, of a grip secured to the end of the handle bar, a control slidably mounted on the grip, and means extending along the handle bar for connecting said control with a working member.

8. The combination with a motorcycle or bicycle handle bar, of a grip secured to the end of the handle bar, a control slidably mounted on the grip, a frictional slide connected with said control, and means carried by the handle bar for connecting said slide with a working member.

9. The combination with a motorcycle or bicycle handle bar, of a grip secured to the end of the handle bar, a control slidably mounted on the grip, a frictional slide within the grip, means for connecting said slide with a working member, and an adjustable connection between the control and the slide whereby to vary the frictional tension of the slide.

In testimony whereof we affix our signatures.

WILLIAM K. NIGH. [L. S.]
BENJAMIN H. SCHAFF. [L. S.]